D. Zeigler,
Cider Mill.

Nº11,401. Patented July 25, 1854.

UNITED STATES PATENT OFFICE.

DANIEL ZEIGLER, OF LEWISTOWN, PENNSYLVANIA.

CIDER-MILL.

Specification of Letters Patent No. 11,401, dated July 25, 1854.

*To all whom it may concern:*

Be it known that I, DANIEL ZEIGLER, of Lewistown, in the county of Mifflin and State of Pennsylvania, have invented a new and useful Improvement in Cider-Mills; and I do hereby declare that the following is a full, clear, and exact description of the same, reference being had to the accompanying drawings, forming part of this specification, in which—

Figure 2:
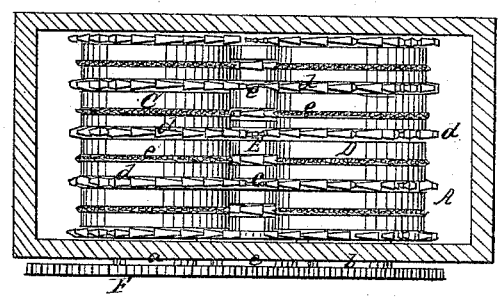
Figure 1:
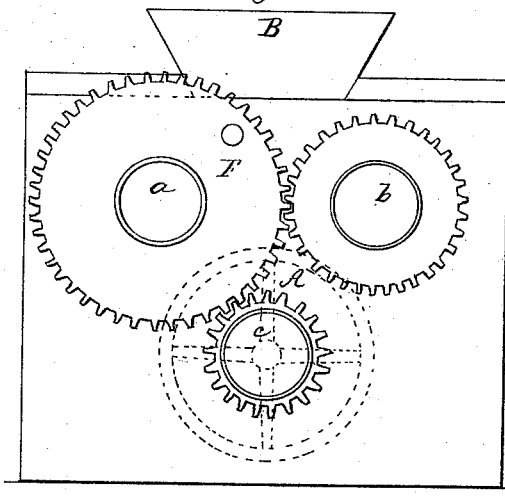
Figure 3:
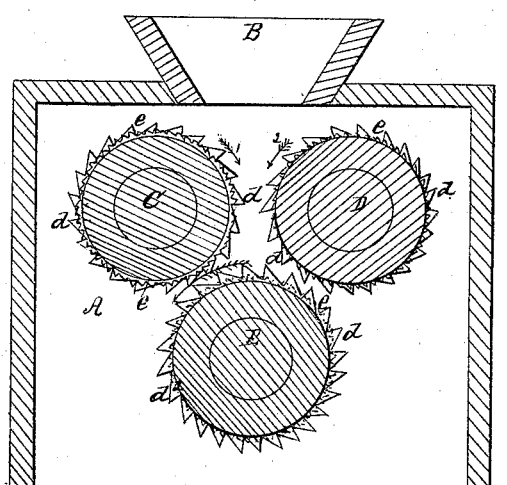

Figure 1, is a side elevation of the grinding mill. Fig. 2, is a vertical longitudinal section of the same—and Fig. 3, is a plan of ditto, the top being removed.

Similar letters of reference in each of the several figures indicate corresponding parts.

My cider mill consists of three grinding rollers which are arranged two in the same horizontal plane and the third centrally under the other two, each roller having several rows of teeth or spur cutters around its periphery, of alternately small and large size each circular row, but of uniform size in each row, and each roller being made to revolve at a greater or less velocity than the other, and the largest teeth of the lower roller being made to operate in connection with the smallest teeth of the upper rollers and the smallest teeth of the lower roller with the largest teeth of the upper, and consequently as the apples come between the two first rollers and are mashed into flat cakes they are, instead of being discharged in that state, instantly cut or broken into small particles by the roller which has the greatest velocity of the two and fed down rapidly to the lowest roller which moves at a greater speed than the others and grinds the pomace very fine and fast and also clears it from out the grooves and the teeth which forms them. It is the different velocities at which the rollers move and their peculiar arrangement in relation to one another and the shape and set of the different sized spur teeth, or cutters around the peripherey of the rollers that effect the result of mashing and grinding the apples and at the same time keeping the cutters and grooves between them always free from clogging or choking while the grinding operation is being performed.

To enable others skilled in the art to make and use my invention I will proceed to describe its construction and operation.

A, represents the box or case in which the rollers are arranged—it has a hopper B, on its top, into which the apples are placed and fed to the rollers.

C, D, E, are the grinding rollers each having bearings $a$, $b$, $c$, in the frame A, as seen in the drawing.

The roller C, has its periphery set with spur teeth or cutters $d$, $e$; those $d$ being double the size of those lettered $e$; the object of having these teeth of different sizes is that the lowest roller E, may be set very near to those D, E, as will be seen in Figs. 2, and 3. The largest teeth of this roller being set in line with the smallest teeth of the other two and consequently the lowest roller can be set very near the others without interferring with their operation and cut the apples very fine. All the rollers have similar spur teeth or cutters set around and along their periphery—those of the roller C, cutting in the direction indicated by the arrow 1, and those of the holer D, cutting in the direction shown by the arrow 2; and those of the roller E, in the line designated by the arrow 3—each operating in concert with the other and those C, D, serving to mash the apples and that E, to grind them fine.

The roller C, has a large cog wheel F, on its shaft—and the roller D, carries one of less diameter and that E, has a still smaller pinion H, for operating it—these two latter wheels are set so as to gear into the large wheel—in the manner shown in Fig. 1. The wheel H, makes three revolutions to two of the wheel F, and $1\frac{1}{2}$, to every revolution of that of the wheel G,—thus it will be seen that these wheels all have different velocities and consequently it is impossible for the pomace to remain in a solid cake, but that it will be cut and broken into fine particles by the cutters which have the greatest speed.

I do not claim, as new, the mere arrangement of the rollers, nor yet one of the rollers running at a different velocity to the others, nor yet again, merely of itself, varying the size of the teeth on the rollers—but I do claim as new and useful, and desire to secure by Letters Patent, the arrangement herein shown and described of the spur teeth on the rollers in rows round the periphery, of regular sizes in each row but the teeth in the one row being larger than the teeth in the adjoining row, and the smaller teeth of the lower roller being arranged opposite the larger teeth of the upper rollers, and all three rollers running at different velocities as specified, and constructed and arranged as and for the purposes set forth.

DANIEL ZEIGLER.

Witnesses:
V. HOOVER,
H. J. WATTERS.